United States Patent [19]

Stepp

[11] 3,956,091

[45] May 11, 1976

[54] METHOD OF ELECTRODEPOSITING

[75] Inventor: Owen D. Stepp, Sarver, Pa.

[73] Assignee: PPG Industries, Inc., Pittsburgh, Pa.

[22] Filed: May 16, 1974

[21] Appl. No.: 470,479

[52] U.S. Cl. .............................................. 204/181
[51] Int. Cl.² .................. C25D 13/06; C25D 13/14
[58] Field of Search ................................... 204/181

[56] References Cited
UNITED STATES PATENTS

| | | |
|---|---|---|
| 3,522,163 | 7/1970 | Hartzell et al. .................... 204/181 |
| 3,536,640 | 10/1970 | Kapalko et al. ..................... 204/181 |
| 3,730,865 | 5/1973 | Kapalko et al. ..................... 204/181 |

*Primary Examiner*—Howard S. Williams
*Attorney, Agent, or Firm*—William J. Uhl

[57] ABSTRACT

Water-dispersed coating compositions which can be applied by electrodeposition contain an at least partially-neutralized acrylic interpolymer, an amine-aldehyde condensation product, and a methylol phenol ether composition of the formula:

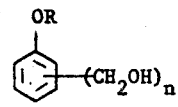

where $n$ is an integer of from 1 to 3, and R is an unsaturated aliphatic group or a halogenated derivative of such a group. These compositions are easily and efficiently applied by electrodeposition to metal containers to provide uniform, hard, adherent coatings characterized by reduced sulfide staining when compared to compositions without the methylol phenol ether.

10 Claims, No Drawings

METHOD OF ELECTRODEPOSITING

Background of the Invention

Various electrodepositable compositions wherein the vehicle resin comprises a mixture of an at least partially-neutralized acrylic interpolymer and an amine-aldehyde condensation product have been utilized in the coatings industry. A number of such compositions which have attained commercial acceptance are disclosed in U.S. Pat. No. 3,403,088. These compositions are employed alone, or in combination with other resins and are utilized as clear films or as resinous vehicles for primers, enamels, or other thermosetting compositions containing pigments. These compositions provide highly desirable coatings having many desirable properties, includig high dielectric strength, relatively high throwpower and relatively high gloss.

Although compositions comprising the acrylic interpolymers and the amine-aldehyde condensation products provide coatings having outstanding overall properties which make them highly desirable for many applications, for some uses they have certain disadvantages. For example, when formulated as to provide optimum properties of certain types, they tend to be deficient in other properties. One especially troublesome property is sulfide staining resistance, which means the ability to withstand the presence of sulfide containing materials, either in hot or cold form, without degrading the coating on the substrate. Sulfide staining is generally recognizable as a black formation on the coated substance. Sulfide staining resistance is an extremely important property in any coating for use on metal food containers, particularly when used with food products such as corn, beans, and the like.

Summary of the Invention

It has now been found that coating compositions having particularly good properties, including unexpectedly outstanding sulfide staining resistance, are obtained by combining the aforesaid mixture of the acrylic interpolymer and the amine-aldehyde condensation product with one or more methylol phenol ethers. Such coating compositions provide numerous advantages, including exceptional sulfide staining resistance, as well as improved adhesion to many substrates. Further, these advantages are obtained without detracting from other useful properties.

Detailed Description of the Invention

The water-dispersed coating compositions of the instant invention contain an at least partially-neutralized acrylic interpolymer, an amine-aldehyde condensation product and one or more methylol phenol ethers. These compositions are easily and efficiently applied by electrodeposition and provide uniform, hard, adherent coatings characterized by increased sulfide staining resistance when compared to compositions without the methyl phenol ether.

While the concentration of the coating components in water is not critical within relatively wide limits, a substantial part of the composition is water and the preferred compositions for use in electrodeposition contain from 65 percent to about 99 percent water; that is, the coating components form from about one percent to about 35 percent by weight of the overall water-dispersed composition. It is desirable to use as low a concentration as will give satisfactory results and thus compositions with from about one percent to about 15 percent non-volatile resin solids are typically used.

The compositions of the instant invention include an acrylic interpolymer. The acrylic interpolymer is an interpolymer of from about one percent to about 20 percent by weight of a hydroxyalkyl ester of an alpha, beta-ethylenically unsaturated carboxylic acid, from about 1 to about 20 percent by weight of an unsaturated carboxylic acid, and at least one other ethylenically unsaturated monomer copolymerizable with the acid and the ester.

The preferred hydroxyalkyl esters of the acrylic interpolymer are esters of acrylic acid and methacrylic acid in which the hydroxylakyl group has up to 5 carbon atoms, such as 2-hydroxyethyl acrylate, 2-hydroxypropyl acrylate, 3-hydroxypropyl acrylate, 2-hydroxyethyl methacrylate, 2-hydroxypropyl methacrylate, 3-hydroxypropyl methacrylate, 4-hydroxybutyl methacrylate, mixtures thereof, and the like. Corresponding esters of other unsaturated acids, for example, ethacrylic acid, crotonic acid, and similar acids of up to about 6 carbon atoms, can also be used.

In addition to esters of unsaturated monocarboxylic acids, there may be employed mono- or diesters of unsaturated dicarboxylic acids, such as maleic acid, fumaric acid, and itaconic acid, in which at least one of the esterifying groups contains a hydroxyl group. Examples of such esters include mono(2-hydroxyethyl)-maleate, mono(2-hydroxyethyl)fumarate, bis(2-hydroxyethyl)maleate, mono(2-hydroxypropyl)maleate, bis(2-hydroxypropyl) maleate, mono(2-hydroxyethyl)itaconate, bis(2-hydroxyethyl)itaconate, 2-hydroxyethylbutyl maleate, and the like.

The unsaturated acid monomer of the interpolymer is preferably acrylic acid or methacrylic acid, although other acids of up to 6 carbon atoms, such as the unsaturated monocarboxylic acids and dicarboxylic acids described above in connection with the esters can also be used. When a monoester of a dicarboxylic acid is used as the hydroxyalkyl monomer, it may also be considered as all or part of the acid monomer.

The remainder of the acrylic interpolymer is made up of one or more other ethylenically unsaturated monomers copolymerizable with the ester and acid. Any such monomer can be used, including the various alkyl esters of alpha, beta-ethylenically unsaturated carboxylic acids, such as the alkyl acrylates and alkyl methacrylates, including the ethyl, methyl, propyl, butyl, hexyl, ethylhexyl, and lauryl acrylates and methacrylates, as well as similar esters having up to 20 carbon atoms in the alkyl group. A vinyl aromatic hydrocarbon may also be employed in the interpolymer, typical examples being styrene, alpha-alkyl styrene and vinyl toluene.

Still other unsaturated monomers which can be used include various monoolefinic and diolefinic hydrocarbons, halogenated monoolefinic and diolefinic hydrocarbons, other unsaturated esters of organic and inorganic acids, unsaturated nitriles, unsaturated amides, other unsaturated acids and the like. Specific usable monomers include ethylene, 1,3-butadiene, acrylonitrile, vinyl acetate, alpha-chlorostyrene, vinyl chloride, methyl crotonate, allyl chloride, and the like.

The acrylic interpolymers are produced using conditions and catalysts conventionally employed in making acrylic polymers. For example, a free radical catalyst is usually present and the polymerization temperatures are generally between about 65°C. and 140°C.

The acrylic interpolymer should be at least partially neutralized; that is, all or part of the acidic carboxyl groups in the interpolymer should be neutralized in order to obtain the properties desirable in electrodeposition processes. In general, the degree of neutralization should be sufficient to provide a stable dispersion. Ordinarily, at least about 10 percent, and preferably at least about 50 percent of the acidic groups are neutralized. Neutralization is accomplished by reaction of the acidic groups of the interpolymer with a base, with the reaction being carried out either before or after the introduction of the interpolymers in the coating composition.

Inorganic bases, such as metal hydroxides, as well as organic bases, such as ammonia or other amines, can be utilized for the neutralization of the interpolymer. As is recognized in the art, the neutralization reaction is accomplished by mixing the neutralizing base with the interpolymer or the water-dispersed composition. A water solution or other solution of the base may be utilized and, if desired, moderately elevated temperatures may be employed.

The non-volatile portion of the water-dispersed compositions of the instant invention also includes an amine-aldehyde condensation product.

The amine-aldehyde products employed herein are aldehyde condensation products of melamine, urea, acetoguanamine, or a similar compound. They may be water-soluble or they may be organic solvent-soluble. Generally, the aldehyde employed is formaldehyde, although useful products can be made from other aldehydes, such as acetaldehyde, crotonaldehyde, acrolein, benzaldehyde, furfural, and the like. Condensation products of melamine or urea are the most common and are preferred, but products of other amines or amides in which at least one amino group is present can also be employed.

Useful condensation products can be produced from triazines, diazines, triazoles, guanidines, guanamines, and alkyl- and aryl-substituted derivatives of such compounds, including alkyl-substituted and cyclic ureas, and alkyl- and aryl-substituted melamines. Some examples of such compounds are N,N'-dimethyl urea, benzyl urea, N,N'-ethylene urea, diazine diamide, formaguanamine, banzoguanamine, ammeling, 2-chloro-4,6-diamino-1,3,5-triazine, 3,5-diamino triazole, 4,6-diaminopyrrimidine, 2,4,6-triphenyltriamino-1,3,5-triazine and the like.

These aldehyde condensation products contain methylol groups or similar alkylol groups, depending upon the particular aldehyde employed. If desired, these methylol groups can be etherified by reaction with an alcohol. Various alcohols are employed for this purpose, including essentially any monohydric alcohol, although the preferred alcohols are methanol, butanol, and similar lower alkanols.

The amine-aldehyde condensation products are produced in a manner well known in the art, using acidic or basic catalysts and varying conditions of time and temperature. The aldehyde is often employed as a solution in water or alcohol, and the condensation, polymerization, and etherification may be carried out either sequentially or simultaneously.

In producing the compositions of the instant invention, the above-described acrylic interpolymers and amine-aldehyde condensation products are combined with a methylol phenol ether composition consisting essentially of one or more methylol phenol ethers of the formula:

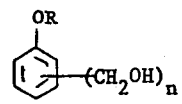

where $n$ is an integer from 1 to 3 and R is an unsaturated aliphatic group or halogen-substituted unsaturated aliphatic group. The groups represented by R should contain at least 3 carbon atoms and can be, for example, allyl groups (which are preferred) or others such as methallyl, crotyl, butenyl, or the like. The halogen-substituted unsaturated groups represented by R can be various mono- and polyhalogenated derivatives of the above unsaturated aliphatic groups; for example, 2-chloroallyl, 3-chloroallyl, 3-chloro-2-methallyl, 1-chloro-2-butenyl, and corresponding groups containing other halogens, such as bromine or fluorine.

The methylol phenol ether compositions employed herein are described in U.S. Pat. No. 2,579,330, and, as disclosed therein, can be produced from sodium or barium salts of 2,4,6-tris(hydroxymethyl)phenols, which are obtained by reacting formaldehyde with phenol in the presence of sodium or barium hydroxide. Several methylol phenol ether compositions of this type are commercially available and these generally comprise mixtures of allyl ethers of mono-, di- and trimethylol phenols (substituted in the ortho-, para-, and meta-positions). The trimethylolated derivative is generally the predominant component of the composition. Such commercially-available methylol phenol ether compositions are preferred for use in the compositions of the instant invention.

While the amounts of each component may be widely varied, in order to obtain optimum sulfide staining resistance, the composition should contain from about 50 to about 94 percent by weight of the acrylic interpolymer, from about 5 to about 49 percent by weight of the amine-aldehyde condensation product, and from about one to about 45 percent by weight of the methylol phenol ether composition, all percentages being based on the combined weight of all three components. The presently-preferred compositions contain from about 50 to about 90 percent by weight of the acrylic interpolymer, from about 5 to about 45 percent by weight of the amine-aldehyde condensation product, and from about 5 to about 20 percent by weight of the methylol phenol ether composition.

In formulating the coating composition herein, ordinary tap water may usually be employed. However, such water may sometimes contain a relatively high level of cations which, while not ordinarily rendering the process inoperative, can cause variations in certain properties of the composition when it is used in electrodeposition. This can be overcome by the use of distilled water or deionized water from which free ions have been removed, as by passage through an ion exchange system.

In the electrodeposition process, a process well described in the art, an aqueous bath containing the composition is placed in contact with an electrically-conductive anode and an electrically-conductive cathode. The compositions herein are anionic and, accordingly, will deposit on the anode. Thus, upon passage of electric currennt between the anode and cathode, while in contact with the bath, an adherent film of the coating composition is deposited on the anode.

The conditions under which the electrodeposition process is carried out are those conventionally used in electrodeposition. The applied voltage may vary greatly and can be as low, for example, as one volt or as high, for example, as 500 volts or higher. The applied voltage is typically between 50 and 350 volts.

The anode, or substrate, employed may be any electrically-conductive metal, such as iron, steel, aluminum, galvanized steel, phosphatized steel, zinc and the like.

While the dispersed vehicle resins of the instant invention can be used alone in electrodeposition baths to form clear coatings, it is frequently desirable to incorporate into the compositions other materials, such as coupling solvents, pigments, antioxidants, wetting agents, anti-foaming agents, suspending agents, bactericides, and other adjuvants typically found in paint formulations.

As hereinbefore indicated, the compositions of the instant invention exhibit increased sulfide staining resistance. Accordingly, the compositions herein are eminently suitable as interior metal container coatings where the containers are used with food products such as corn, beans and other products which contribute to or cause sulfide staining. It is to be recognized, however, that the compositions herein will provide suitable coatings in many other areas where sulfide staining may be a problem.

Once the film has been deposited upon the substrate and the substrate removed from the bath, the article is heated in an oven or by some other appropriate means to bake the film. Baking conditions of about 275°F. to about 450°F. for 60 minutes to several seconds are typically employed.

The invention is further described in conjunction with the following examples, which are to be considered illustrative rather than limiting. All parts and percentages in the examples and throughout this specification are by weight unless otherwise stated.

In the examples which follow, reference is made to Acrylic Interpolymer A and to Acrylic Interpolymer B. Both interpolymers were prepared in accordance with the procedure outlined in U.S. Pat. No. 3,403,088. Acrylic Interpolymer A was derived from a monomer charge consisting of 55 parts butyl acrylate, 25 parts styrene, 15 parts methacrylic acid, and 5 parts hydroxyethyl methacrylate, and consisted of a non-volatile solids content of 74 percent in butyl Cellosolve and possessed an acid value of 68.2, and a viscosity of 128,000 centipoises. Acrylic interpolymer B was derived from a monomer charge consisting of 55 parts butyl acrylate, 25 parts styrene, 15 parts methacrylic acid and 5 parts 2-hydroxypropyl methacrylate, and consisted of a non-volatile solids content of 65 percent in a solvent blend of 52 parts methyl Cellosolve and 48 parts isopropyl alcohol, and possessed an acid value of 61.4 and a viscosity of 83,800 centipoises.

EXAMPLES 1 through 8

In each of Examples 1 through 8 the materials indicated in Table I were blended to form aqueous dispersions. In Table I, the percentage by weight of each of the resinous components is indicated. The amine-aldehyde condensation product utilized in each example was ethoxymethoxymethyl melamine (available from American Cyanamid Company and designated as Cymel XM-0b 1116). The methylol phenol ether used in each example was a commercially available methylolphenol ether composition known as Methylon 75108. It is essentially a mixture of the allyl ethers of mono-, di- and trimethylol phenols, with the trimethylol derivative predominating, and has the following properties:

| | |
|---|---|
| Solids content | 85 percent |
| Viscosity | 2000–4000 centipoises |
| Pounds per Gallon | 10 |
| Percent Reactive | 98 |

For comparative purposes, a control composition was also used wherein such compositions did not contain the methylol phenol ether.

TABLE I

| MATERIALS | CONTROL | 1 | 2 | 3 | EXAMPLE 4 | 5 | 6 | 7 | 8 |
|---|---|---|---|---|---|---|---|---|---|
| Acrylic Interpolymer A | 204 | 830 | 204 | 204 | 204 | 204 | 204 | 204 | 204 |
| Amine-Aldehyde Condensation Product | 38 | 237 | 65 | 65 | 65 | 65 | 41 | 9.4 | 10.8 |
| Methylol Phenol Ether | — | 213 | 28 | 45 | 64 | 13 | 28 | 33 | 22 |
| 2-Ethyl hexanol | 19 | 106 | 25 | 25 | 27 | 23 | 24 | 19 | 19 |
| Diisopropanolamine | 21 | 85 | 21 | 21 | 21 | 21 | 21 | 21 | 21 |
| Deionized water | 558 | 2780 | 613 | 650 | 696 | 580 | 542 | 464 | 466 |
| Percent Acrylic Interpolymer A | 78 | 60 | 63 | 59 | 56 | 66 | 70 | 80 | 80 |
| Percent Amine-Aldehyde | 22 | 23 | 27 | 26 | 24 | 29 | 19 | 5 | 10 |
| Percent Methylol Phenol Ether | — | 17 | 10 | 15 | 20 | 5 | 11 | 15 | 10 |

TABLE II

| EXAMPLE | Bath Solids (Percent) | Applied EMF (Volts) | Deposition Time (Seconds) | Bath Temp. (°F.) | Baking Temp. (°F.) | Baking Time (Minutes) | Film Build Mg./Sq.In. |
|---|---|---|---|---|---|---|---|
| CONTROL | 2 | 300 | 2 | 77 | 385 | 4 | 2.20 |
| 1 | 5 | 200 | 1 | 78 | 385 | 4 | 2.85 |
| 2 | 5 | 300 | 1 | 78 | 415 | 4 | 2.92 |
| 3 | 5 | 250 | 1 | 78 | 415 | 4 | 2.95 |
| 4 | 5 | 210 | 1 | 78 | 415 | 4 | 2.80 |
| 5 | 5 | 300 | 1 | 78 | 415 | 4 | 2.90 |
| 6 | 5 | 200 | 1 | 78 | 415 | 4 | 3.20 |
| 7 | 5 | 250 | 1 | 78 | 415 | 10 | 3.20 |

TABLE II-continued

| EXAMPLE | Bath Solids (Percent) | Applied EMF (Volts) | Deposition Time (Seconds) | Bath Temp. (°F.) | Baking Temp. (°F.) | Baking Time (Minutes) | Film Build Mg./Sq.In. |
| --- | --- | --- | --- | --- | --- | --- | --- |
| 8 | 5 | 183 | 1 | 78 | 415 | 10 | 3.40 |

The coated articles were then tested for the following:

1. WEDGE BEND: This test consists of bending the coated panel over a cylindrical shaped mandrel, with the coated surface being the outside surface of the bent panel. A weight, typically 1000 grams, is then dropped from a predetermined height, typically about 24 inches, above the bent portion of the panel, and allowed to strike the bend formed at the point closest to the apex of the cylindrical mandrel (i.e., that portion of the bent panel where the two edges of the panel are closest together). The bent panel is then immersed in a solution of 20 percent cupric sulfate, 10 percent hydrochloric acid and 70 percent water for a controlled time based on the substrate used. Copper particles will deposit on the fractured portion of the panel, i.e., where the substrate is exposed. The fracturing of the coating is then observed, generally using a microscope. The results are set forth in terms of millimeters fractured from the point of impact along the line of bending. The test is generally used as an indication of the flexibility of the cured film.

2. WATER PASTEURIZATION RESISTANCE: This test consists of soaking the coated panel in a water bath maintained at a temperature of about 150°F. for 30 minutes. The panel is then removed from the bath and visually observed for blush, which is a milky appearance of the film. An "X" is then cut in the surface of the coating and a pressure-sensitive tape is applied to the "X". The tape is then removed. If the water pasteurization resistance is good, the coating will remain attached to the surface and will not freely break away. Results are set forth on a scale of 0 to 10, with 0 being the best result obtainable.

3. DYE STAIN RESISTANCE: This test consists of immersing a baked coated panel in a solution of 1½ percent Acetosol Blue dye and 98½ percent ethyl alcohol for a time period regulated by the concentration of the dye solution versus a known control. The panel is then visually observed for staining. Results are set forth on a scale of 0 to 10, with 0 being the best result obtainable. The test is generally used to determine the optimum cure schedule.

4. INITIAL ADHESION: This test consists of cutting an "X" in the surface of the coating, applying a pressure-sensitive tape to the "X" portion and rapidly removing the tape. The amount of coating which comes off with the tape is an evidence of the adhesion of the composition to the substrate. Results are set forth in a scale of 0 to 10, with 0 being the best result obtainable.

5. SULFIDE STAINING RESISTANCE: This test consists of placing the coated panel in a container having whole kernel corn of the type commonly sold in grocery stores contained therein. The container is then sealed and heated to 250°F. for 90 minutes. The coated panel is then removed from the container and is visually observed for sulfide staining (generally a very dark or black stain). Adhesion is also tested by the "X" tape method above. Results are set forth on a scale of 0 to 10 with 0 representing the best result obtainable.

The results obtained were as set forth in Table III.

TABLE III

| EXAMPLE | Wedge Bend | Water Pasteurization | Dye Stain | Initial Adhesion | Sulfide Staining |
| --- | --- | --- | --- | --- | --- |
| Control | 32 | <1 | 5 | <1 | 9 |
| 1 | 12 | <1 | 2 | <1 | <1 |
| 2 | 8 | <1 | 3 | <1 | <1 |
| 3 | 24 | <1 | 3 | <1 | <1 |
| 4 | 34 | <1 | 3 | <1 | <1 |
| 5 | 24 | <1 | 2 | <1 | <1 |
| 6 | 20 | <1 | 2 | <1 | <1 |
| 7 | 13 | <1 | 4 | <1 | <1 |
| 8 | 13 | <1 | 4 | <1 | <1 |

EXAMPLE 9

In a manner similar to Examples 1 through 8, the materials in Table IV were blended to form aqueous dispersions. Both the amine-aldehyde condensation product and the methylol phenol ethers were the same as those used in Examples 1–8.

Using the same substrate material as used in Examples 1 through 8, the compositions were formulated and applied as indicated in Table V. The coated articles were then tested in the same manner as those of Examples 1 through 8, with the results set forth in Table VI.

TABLE IV

| MATERIALS | EXAMPLE CONTROL | 9 |
| --- | --- | --- |
| Acrylic Interpolymer B | 98 | 939 |
| Amine-aldehyde condensation product | 32 | 237 |
| Methylol phenol ether | — | 250 |
| 2-ethylhexanol | — | 106 |
| Diisopropanolamine | 10.3 | 85 |
| Deionized water | 210.2 | 2633 |
| Percent acrylic interpolymer B | 67 | 58 |
| Percent amine-aldehyde | 33 | 22 |
| Percent methylol phenol ether | — | 20 |

TABLE V

| EXAMPLE | Bath Solids (Percent) | Applied EMF (Volts) | Deposition Time (Seconds) | Bath Temp. (°F.) | Baking Temp. (°F.) | Baking Time (Mins.) | Film Build Mq./Sq.In. |
|---|---|---|---|---|---|---|---|
| Control | 5 | 240 | 1 | 77 | 385 | 4 | 2.6 |
| 9 | 5 | 300 | 2 | 77 | 385 | 4 | 2.5 |

TABLE VI

| EXAMPLE | Wedge Bend | Water Pasteurizaton | Dye Stain | Initial Adhesion | Sulfide Staining |
|---|---|---|---|---|---|
| Control | 12 | <1 | 5 | <1 | 6 |
| 9 | 20 | <1 | 3 | <1 | 1 |

In a like manner, other acrylic interpolymers, amine-aldehyde condensation products and methylol phenol ethers could be used to attain the excellent results displayed herein.

According to the provisions of the patent statutes, there are described above the invention and what are now considered to be its best embodiments. However, within the scope of the appended claims, it is to be understood that the invention can be practiced otherwise than as specifically described.

I claim:

1. In a method of electrocoating an electrically-conductive surface of a metal container which is used with food products which cause or contribute to sulfide staining, said surface of the metal container serving as an anode which comprises passing electric current between said anode and a cathode in contact with an aqueous electrodepositable composition, the improvement wherein said electrodepositable composition comprises an aqueous dispersion of:
    A. an at least partially-neutralized acrylic interpolymer;
    B. an amine-aldehyde condensation product; and
    C. a methylol phenol ether composition consisting essentially of one or more methylol phenol ethers of the formula:

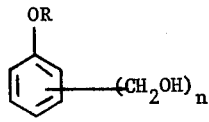

where $n$ is an integer from 1 to 3 and R is an unsaturated aliphatic group or a halogen-substituted unsaturated aliphatic group.

2. The method of claim 1, wherein said acrylic interpolymer is an at least partially-neutralized interpolymer of from about one percent to about 20 percent by weight of a hydroxyalkyl ester of an alpha, beta-ethylenically unsaturated carboxylic acid, from about one percent to about 20 percent by weight of an unsaturated carboxylic acid, and at least one other copolymerizable ethylenically-unsaturated monomer.

3. The method of claim 2, wherein the vehicle of said aqueous dispersion comprises:
    A. from about 50 to about 94 percent by weight of said acrylic interpolymer;
    B. from about 5 to about 49 percent by weight of said amine-aldehyde condensation product; and
    C. from about one to about 45 percent by weight of said methylol phenol ether composition.

4. The method of claim 3, wherein the vehicle of said aqueous dispersion comprises:
    A. from about 50 to about 90 percent by weight of said acrylic interpolymer;
    B. from about 5 to about 45 percent by weight of said amine-aldehyde condensation product; and
    C. from about 5 to about 20 percent by weight of said methylol phenol ether composition.

5. The method of claim 3, wherein the trimethylolated derivative is predominant in said methylol phenol ether composition.

6. The method of claim 1, wherein the vehicle of said aqueous dispersion comprises:
    A. from about 50 to about 94 percent by weight of said acrylic interpolymer;
    B. from about 5 to about 49 percent by weight of said amine-aldehyde condensation product; and
    C. from about one to about 45 percent by weight of said methylol phenol ether composition.

7. The method of claim 6, wherein the vehicle of said aqueous dispersion comprises:
    A. from about 50 to about 90 percent by weight of said acrylic interpolymer;
    B. from about 5 to about 45 percent by weight of said amine-aldehyde condensation product; and
    C. from about 5 to about 20 percent by weight of said methylol phenol ether composition.

8. The method of claim 6, wherein the trimethylolated derivative is predominant in said methylol phenol ether composition.

9. The method of claim 1, wherein said methylol phenol ether composition consists essentially of a mixture of allyl ethers of mono-, di- and trimethylol phenol.

10. An article produced by the method of claim 1.

* * * * *